United States Patent Office 3,096,188
Patented July 2, 1963

3,096,188
STRUCTURAL COMPOSITION MATERIAL AND PROCESS FOR MAKING SAME
Paul Maydl, Landstrasse 113, Linz, Austria
No Drawing. Filed Dec. 8, 1960, Ser. No. 74,446
Claims priority, application Austria Mar. 18, 1957
6 Claims. (Cl. 106—97)

My present invention relates to structural composition materials such as mortar and concrete which comprise a hydraulic binder matrix, preferably cementitious, and a granular slag aggregate as broadly disclosed in my co-pending application Ser. No. 722,117, filed March 18, 1958 (now abandoned), of which the present application is a continuation-in-part.

The use of comminuted blast-furnace slag as an aggregate, either alone or in combination with other pulverulent fillers, which is admixed with a hydraulic binder such as Portland cement, lime or the like has long been known. The physical properties and the chemical compositions of the slag aggregates depend largely upon the metal-refining processes and the types of furnaces from which they are derived, and the methods by which they are recovered and comminuted. These physical and chemical properties, in turn, influence considerably the strength, wear-resistance and other structural characteristics of the composite in which they are used. Thus, blast-furnace slag consists mainly of silicates and aluminates of calcium and magnesium, manganous oxide and, to lesser extents, iron oxides, alkalis, and oxides, borides, carbides and nitrides of barium, while slag from gold-, silver- and lead-refining processes contain quantities of lead oxide. Slags having substantial basicities (large lead-oxide contents) are generally unsuitable for most construction purposes since they reduce the silicic-acid content of concretes by neutralization.

Almost all blast-furnace slags fall into one of the four following classifications, based upon their chemical compositions: (A) basic slags rich in lime; (B) slags rich in magnesia; (C) acid slags rich in silicic acid; and (D) slags having a high manganese content.

The particle size, configuration and strength and even, to an extent, the chemical composition of slag aggregates are determined by the rate of solidification of the slag melt and by the method of cooling the latter. Slow cooling of the melt, for example, results in the formation of a crystalline solid structure, having pores produced by trapped gases, which may be crushed to form a light, fine gravel. The inoculation of a slowly cooled melt with finely divided material results, on the other hand, in a crystalline solid which is relatively dense, ductile, resistant to compression and substantially free from pores.

The rapid quenching of hot liquid slag in a small quantity of water, which is immediately converted to steam, produces a highly porous glassy amorphous structure which is commonly and variously known as "foamed," "pumice" and "expanded" slag. The latter designation (expanded slag) shall be used henceforth to identify particulated slags which have an amorphous cellular structure, with an unpacked or bulk weight per liter of 0.4 to a maximum of 0.9 kilogram, and which are generally separated from heavier particles after quenching by flotation methods. Expanded slag may also be produced by permitting the liquid slag to contact high-speed jets of water or air and then separating out the heavier particles by flotation. The lighter particles have been used, heretofore, as a light-weight aggregate in conjunction with minerals such as vermiculite and other micaceous materials as a filler for concretes and plasters. Expanded-slag concretes have been particularly useful in the manufacture of artificial rocks, so-called "cinder" blocks, and at locations where the high heat- and sound-insulating ability of expanded slag may be exploited.

Expanded slag is a particularly effective additive to concretes and plasters since its multiple small cavities and pores are not interconnected and thus do not absorb moisture. The unpacked or bulk weight per liter of expanded slag, which is commercially available as coarse particles (12 to 25 mm.), medium particles (3 to 12 mm.) and fine particles (under 3 mm.), may be determined by sieving after drying at 105° C.±5° C. to remove particles below 8 mm. and above 18 mm. The aggregate having a particle size between 8 mm. and 18 mm. is then permitted to fall from a hand shovel into a 5-liter container, without agitation, from a height of 10 cm. The average of three determinations is taken as the unpacked weight per liter.

Slag can also be comminuted by rapid quenching of the liquid material in large quantities of water, whereupon a glassy and sandy aggregate is produced. Cooling in the presence of steam or hot air often results in thin fibers which have been termed "wool." The wool is particularly useful as an insulating material adapted to absorb heat and sound.

I have found that mortars, plasters and concretes which comprise expanded slag in conjunction with silica sand and other conventional aggregate materials are either too lightweight to be useful for heavy construction (e.g. foundations, harbor facilities and the like) or insufficiently resistive to compressive forces. Expanded slags are generally derived from basic slags rich in lime (classification A) or slags rich in magnesia (classification B) and thus must be combined with heavy minerals such as silica sand or light minerals such as vermiculite (39% $SiO_2$) to obtain the silica content required for proper curing of the resulting composition. I have also found that considerable quantities of slag, particularly the non-floatable fraction of the expanded-slag-producing processes, are discarded as unsuitable for use as aggregates in concretes, plasters and mortars by reason of the limited plasticity flowability and strength of the large grains of this slag and of the sharp edges thereof.

It is an object of the present invention to provide an improved composition material adapted to utilize hitherto discarded portions of comminuted blast-furnace slags.

Still another object of my invention is to provide a process for making slag aggregates suitable for use in concretes and mortars required to withstand high compressive forces, with sufficient density to be used in heavy construction and yet having good insulating ability.

A further object of the invention is to provide a process for manufacturing an improved composition material making use of blast-furnace slag.

In my above-identified co-pending application I have disclosed an improved aggregate which has been designated as "granular" in order to distinguish it from expanded-slag aggregates. My present invention describes additional compositions utilizing granular slag as well as a process for making such slag.

According to a feature of the invention I produce the granular slag by introducing a pig-iron blast-furnace-slag melt rich in silicic acid (classification C) into an agitated cooling fluid, such as water or air, whereupon a sharp-edge glassy sand having large brittle grains is formed. This sand is similar to the particles which settle out in the flotation separation of expanded slag from its sediment. The slag sand comprises coarse irregular grains having a maximum particle size of about 8 mm. which are of generally elongated configuration and are porous to a limited extent; few of the grains have a particle size below 1 mm. The slag sand has a bulk weight greater than 0.8 kg./l.

(about 50 lbs./cu. ft.) and usually less than 2.90 kg./l. (about 180 lbs./cu. ft.).

The above-described slag sand has a substantially homogeneous chemical composition wherein the sulfur content is chemically bound to calcium as the sulfide and is, therefore, not detrimental to the use of the slag in a concrete mix. Furthermore, the magnesium content of the slag is not in the form of the objectionable compound periclase (MgO).

While the slag sand described in generally unsuitable for direct use in concretes because of its non-hydraulic limited flowability and non-adhering qualities, I have found that the slag sand can be converted into the exceptionally satisfactory granular slag, disclosed in the aforementioned co-pending application, which then has the specific gravity of the slag sand from which it is derived. The relatively dense slag sand is broken up (e.g. by crushing in a roll mill) to obtain a granular slag, having a maximum grain size of 5 mm., which consists of at least 10% but not more than 50% by weight, of particles having a grain size below 0.2 mm. By thus crushing the large, brittle and irregular grains of slag sand I have greatly improved the plasticity of the granules and found that their resistance to compressive forces has been enhanced. Furthermore, the sharp edges of the grains are rounded off to increase their flowability while any thread-like grains are ground to a powder (below 0.2 mm.), thereby enriching the aggregate with particles whose silicic-acid content is readily available to react with molecules of cement to assist in curing the concrete wherein the aggregate is bound. The granular-slag aggregate not only serves as a densifying filler and extender in the concrete, plaster or mortar, but also enters into chemical combination with the cement as a consequence of the high silica content of the slag.

The granular slag is dispersed through cementitious matrices of lime or lime-gypsum plasters to produce roughing and/or finishing wall plasters and mortars, or of Portland, Roman, iron-Portland or slag cement to form concretes, and may be used alone or in conjunction with other fillers and aggregates. I have found that a particularly suitable additive to cementitious matrices containing granular slag is expanded slag in quantities up to 50% by volume of the composition. The resulting composition is lightweight and highly insulating and possesses great resistance to compressive forces. The concrete composition does not, of course, require the addition of silicaceous materials to facilitate hardening since the silicic-acid content of the granular slag is sufficient the silica content of the granular slag should greatly exceed that of the expanded slag.

The above and other objects, features and advantages of the present invention will become more readily apparent from the following specific examples which are illustrative of the processes and compositions of the invention.

*Example 1*

A water-granulated slag sand is prepared by rapidly quenching a stream of blast-furnace slag rich in silicic acid (classification C) in an agitated bath of water. The large, brittle and sharp-edged sand, which has a bulk density or weight between 0.8 kg./l. and 2.90 and contains particles between 1.0 and 8.0 mm. in size, is removed from the bottom of the bath, dried, and crushed in a cylindrical mill until a maximum particle size of 5 mm. is attained and until between 10 and 50% of the granular slag thus formed has a particle size below 0.2 mm.

About 10 parts-by-weight of the granulated slag (bulk weight between 1.0 and 2.9 kg./l.), which consists of between 1 and 5 parts of particle size less than 0.2 mm., are admixed with 2½ to 3 parts of Portland cement (specific gravity about 3.15) and with two parts of water. The resulting cement mortar is permitted to harden and is found to have a resistance to compression of 400 to 500 kg./cm.$^2$. The Portland cement may be replaced by about the same quantity of lime to produce a lime mortar only slight less strong than the cement mortar described.

In general I prefer to use cement or lime and granular slag in ratios ranging from 1:2.5 to 1:6 in parts-by-volume which corresponds, approximately, to between 1:3 and 1:7½ in parts-by-weight, depending, of course, on the specific gravities of the cement, lime and slag used. The use of substantially less than a 1:2.5 cement-to-slag ratio tends to result in the formation of shrinkage cracks in the hardened composition while the use of ratios greater than 1:6 leads to soft composition materials upon setting.

*Example 2*

A mixture of 20 parts-by-volume of granular slag and 5 parts of type I Portland cement (general normal) is combined with 12 parts-by-volume of expanded slag (bulk weight between 0.5 and 0.8) kg./l. and 5 parts of water. The expanded slag has a particle size between 4 and 12 mm. The resulting concrete, upon solidification, has a high compressive strength and exceptionally good insulating qualities.

*Example 3*

One cubic meter of concrete of high compressive strength is formed by admixing 1,200 kg. of granular slag, comprising between 120 kg. and 600 kg. of particles having a grain size below 0.2 mm., with 300 kg. of type III Portland cement (early high-strength), 450 kg. of expanded slag having a particle size greater than 3 mm., and 250 kg. of water. The resistance to compression of this concrete, after 28 days, approaches 400 kg./cm.$^2$ which is substantially the maximum strength of concretes using conventional gravel admixtures. The conventional concretes, however, have poor insulating ability whereas a granular-slag concrete prepared with an expanded-slag extender possesses high insulating ability. A 30-cm. thick wall of the granular-slag concrete meets current industrial norms for insulating walls without the use of additional insulating materials.

*Example 4*

A dry-mix blender is charged with 15 parts-by-volume of granular slag prepared as described above, 12 parts of expanded slag having a particle size greater than 3 mm., 5 parts of cement and 5 parts of water. The liquid composition is cast into blocks by conventional molding machines wherein the hardening blocks are settled by vibration. The resulting blocks have a compressive strength up to 300 kg./cm.$^2$ which is substantially equal to that of building bricks. The blocks have a fine grainy texture and heat-insulating ability which renders them satisfactory for exterior walls. The liquid composition described may be cast directly into walls or other reinforced or self-supporting structural members which will have substantially the same physical characteristics as the blocks.

The processes and compositions described hereinabove are believed to admit of many modifications and variations considered as being within the ability of persons skilled in the art and intended to be included within the spirit and scope of the invention as defined in the appended claims.

I claim:

1. A process for making a structural composition material, comprising the steps of forming a granular-slag aggregate by quenching molten blast-furnace slag rich in silicic acid in an agitated fluid to produce an acidic coarse slag sand having a bulk weight between substantially 0.8 and 2.90 kg./l. at least a major fraction of said sand having a particle size between substantially 1 and 8 mm., and crushing said sand to a maximum particle size of approximately 5 mm. and until a proportion thereof ranging between substantially 10 and 50% by weight of said sand consists of particles having a grain size ranging up to 0.2 mm.; and admixing with said aggregate a hydraulic binder and water.

2. A process according to claim 1 further comprising the step of admixing with said aggregate a comminuted expanded slag having a bulk weight up to 0.9 kg./l. and a minimum particle size greater than 3 mm.

3. A process according to claim 1 wherein said binder is a material selected from the group which consists of portland cement, gypsum and lime.

4. A process according to claim 3 wherein the volume ratio of said slag to said binder is between substantially 2.5:1 and 6:1.

5. A process according to claim 1, further comprising a comminuted expanded slag, having a bulk weight up to 0.9 kg./l. and a minimum particle size greater than substantially 3 mm., admixed with said granular slag, said expanded slag constituting a minor fraction of the total volume of the admixture.

6. A process according to claim 5 wherein the silica content of said granular slag greatly exceeds that of said expanded slag.

References Cited in the file of this patent

UNITED STATES PATENTS

| | | |
|---|---|---|
| 1,996,452 | Bjorkman | Apr. 2, 1935 |
| 2,182,714 | Witt | Dec. 5, 1939 |
| 2,715,583 | Ziegler | Aug. 16, 1955 |
| 2,721,805 | Burke | Oct. 25, 1955 |
| 2,793,957 | Mangold et al. | May 28, 1957 |
| 2,997,721 | Von Gronow et al. | Apr. 4, 1961 |

FOREIGN PATENTS

| | | |
|---|---|---|
| 213,237 | Australia | July 26, 1956 |

OTHER REFERENCES

Lee and Desch: The Chemistry of Cement and Concrete, pages 399–402, 416, pub. 1952, Edw. Arnold, Ltd., London.